United States Patent
MacDonald et al.

[19]

[11] Patent Number: 6,011,623
[45] Date of Patent: Jan. 4, 2000

[54] FAULT DETECTION SYSTEM FOR AN AMPLIFIED OPTICAL TRANSMISSION SYSTEM

[76] Inventors: Robert I. MacDonald, 6452 Clingin La., Manotick, Ontario, Canada; Brian S. Kawasaki, 5541 Pettapiece Crescent, Manotick, Ontario, Canada, K4M 1C5

[21] Appl. No.: 09/093,400

[22] Filed: Jun. 9, 1998

[51] Int. Cl.[7] .................................................. G01B 9/02
[52] U.S. Cl. ............................ 356/352; 356/73.1; 359/110
[58] Field of Search .................................. 356/352, 73.1; 359/110

[56] References Cited

U.S. PATENT DOCUMENTS

| | | | |
|---|---|---|---|
| 5,825,516 | 10/1998 | Walsh | 359/112 |
| 5,825,530 | 10/1998 | Leckel et al. | 359/333 |

*Primary Examiner*—Robert H. Kim
*Assistant Examiner*—Andrew H. Lee
*Attorney, Agent, or Firm*—Neil Teitelbaum & Associates

[57] ABSTRACT

A fault detection circuit and method of detecting catastrophic faults for example from a total line outage due to a transmission waveguide being inadvertently cut, includes tapping a sample of the amplified transmission multichannel signal light for analysis. The tapped light is then fed to a periodic filter such as a Mach Zehnder interferometer or a Fabry Perot etalon having a free spectral range and phase at one output that coincides with the channel central wavelengths of the transmission system. Another output of the periodic filter provides an output response that is phase shifted by 180 degrees. Two output signals from the two output two output signals are then compared, in one embodiment by using a photodiode bridge. When one output of the periodic filter has a substantially different signal energy than the other, it is assumed that no faults occur. Conversely when the two outputs are substantially similar, it is assumed that a catastrophic fault has occurred.

17 Claims, 5 Drawing Sheets

FAULT DETECTION SYSTEM FOR AN AMPLIFIED OPTICAL TRANSMISSION SYSTEM

FIELD OF THE INVENTION

This invention relates to an optical test apparatus, and in particular to an apparatus for detecting and monitoring for faults in optical fibres.

BACKGROUND OF THE INVENTION

It is well known that faults in optical fibres can be located by an optical time domain reflectometer (OTDR). An OTDR typically launches a pulse of light into an optical fibre, and backscattered light is monitored for abrupt changes indicative of a loss or fault. The distance of the loss or fault from the launch end of the fibre can be determined from the time interval between the launch and the return of the backscattered peak. Once a period of time sufficient to receive all detectable backscattered light has passed, a further pulse may be launched into the fibre. The pulse width may be varied for different dynamic range or resolution requirements. Thus, for a given amplitude, an increase in the pulse width enables a greater length of fibre to be monitored, that is to say it increases the dynamic range of the OTDR. The dynamic range of an OTDR is the loss after which an event, backscatter or reflection can still be detected.

The OTDR is a useful form of optical test equipment since, from connection to a single end of an optical fibre network, the location of losses and reflections can be determined, and their amplitude measured, to a high degree of accuracy. For loss measurements both point-losses and end-to-end fibre or network losses can be measured. However an OTDR system is costly and has limitations when used in an optical system having optical isolators. In duplex networks, the amplitude of any reflections is important, since these may cause crosstalk. In some known schemes it is possible using wavelength division multiplexing (WDM) techniques, to take these measurements at a particular wavelength i.e. 1650 nm whilst the network is carrying data at another wavelength i.e. 1550 nm. However where bandwidth is at a premium, such schemes may not be practicable.

As of late, there has been a demand for a fault testing system that conveniently and inexpensively allows for the reliability testing of individual optical fibres within optical networks of optical fibers. Methods used heretofore in conventional OTDR are not suitable, since the Rayleigh back-scattered light from different branches cannot be differentiated at the OTDR. Notwithstanding, recently, several methods based on multi-wavelength OTDR have been proposed in a paper by I. Sankawa, "Fault Location Technique for In-Service Branched Optical Fiber Networks", published in IEEE Photon. Technol. Lett., vol. 2, no 10, pp 766–768, 1990; a paper by Y. Koyamada, et al, entitled "Recent Progress in OTDR Technologies for Maintaining Optical fiber Networks", IOOC'95, Paper FA1–4, Hong Kong, 1995. a paper by K. Tanaka, et al, "Measuring the Individual Attention Distribution of Passive Branched Optical Networks", IEEE Photon. Technol. Lett., vol. 8, no. 7, pp. 915–917, 1966; and, a paper by M. Shigehara, et al., "Optical Fiber Identification System Using Fiber Bragg Gratings", Technical Digest, OFC'96 Paper WK13, San Jose, 1966; all of which are incorporated herein by reference.

However, these proposed OTDR systems require a wavelength-tunable pulsed light source for the test signals and thus impose high cost and complexity. For the schemes proposed by Sankawa, and Koyamada et al., strong monitoring signals from the wavelength-tunable light sources may deplete the gain of the in-line optical amplifiers and result in system penalty; whereas this invention, in contrast provides an in-service fault detection system which can be provided at a low cost. Due to its low cost, it is practicable to provide fault detection circuitry at each receiving node. Furthermore, the fault detection circuitry in accordance with this invention is substantially passive; hence obviating the requirement for test lasers and components having an associated high failure rate themselves.

Since OTDR systems require either a dedicated channel for in service monitoring, or alternatively require taking a system out of service during a testing interval, such a system is not totally satisfactory. Furthermore, the cost of an OTDR system is substantial. This invention provides an alternative to an OTDR system.

As of late there has been some concern regarding the integrity of optical systems and more particularly with signals transmitted along optical waveguides in an amplified multi-channel WDM optical system. For instance, it is desired to know with certainty that when a break occurs in an optical fiber on an input side of an optical amplifier, that this fault can be detected at the receiving end on the output side of the same amplifier. However, since amplifiers are generally used in a saturated condition, they output light energy even in the absence of an input optical signal. Thus, if a break in the waveguide coupled to the input side of the amplifier occurs, spontaneous emission within the amplifier can be amplified to levels characteristic of an input amplified system. By simply monitoring the power level on the amplifier output side, a fault due to a break on the input side of the amplifier would likely not be detected, as the spontaneous emission produced within the amplifier would be of a power level similar to that of normal signal levels.

In view of the limitations of these aforementioned fault detection systems, it is an object of one aspect of this invention to provide a novel surveillance scheme for fault identification in optically-amplified network without using any extra light source for the test signals.

The invention further obviates the use of a tunable OTDR pulsed light source.

It is a further object of the invention to provide an inexpensive device for testing an optical network of waveguides in the presence of traffic.

SUMMARY OF THE INVENTION

In accordance with the invention, there is provided, 1. A fault detection circuit for optically coupling with an optical path in a multi-channel WDM optical system, said path having an amplifier disposed between an input waveguide and an output waveguide, said fault detection circuit comprising:

means for splitting at least some amplified light present on the output waveguide into a first and second sub signal at first and second output locations respectively, said means having an output response that is periodic in wavelength to an input optical signal and having a predetermined free spectral range at the first location that is offset in wavelength by one half period from a periodic output response to the input optical signal at the second location, and, means optically coupled with the output locations for providing an indication that a fault has occurred.

In accordance with the invention, there is further provided, a fault detection circuit for optically coupling with an optical path in a multi-channel WDM optical system, said path having an amplifier disposed between an input waveguide and an output waveguide, said fault detection circuit comprising:

filter means having an input port and two output ports, said filter means having an output response that is periodic in wavelength at the output ports to light launched into the input port, the output response at one of the output ports being offset in wavelength by one half period with output response at the other of the output ports; and, detection means for detecting a characteristic of light at the output ports for determining if fault has occurred.

In accordance with another aspect of the invention, method is provided of detecting a fault in an optical path in a multi-channel WDM optical system, said path having an amplifier disposed between an input waveguide and an output waveguide, said method comprising:

tapping a portion of amplified light present on the output waveguide;

providing said tapped light to a filter;

detecting at two locations any light from the filter that is present said light at said two locations being phase misaligned in wavelength;

determining from the detected light or absence of light at the locations if a fault is present.

BRIEF DESCRIPTION OF THE DRAWINGS

Exemplary embodiments of the invention will now be described in conjunction with the drawings, in which.

DETAILED DESCRIPTION

Figure 1:
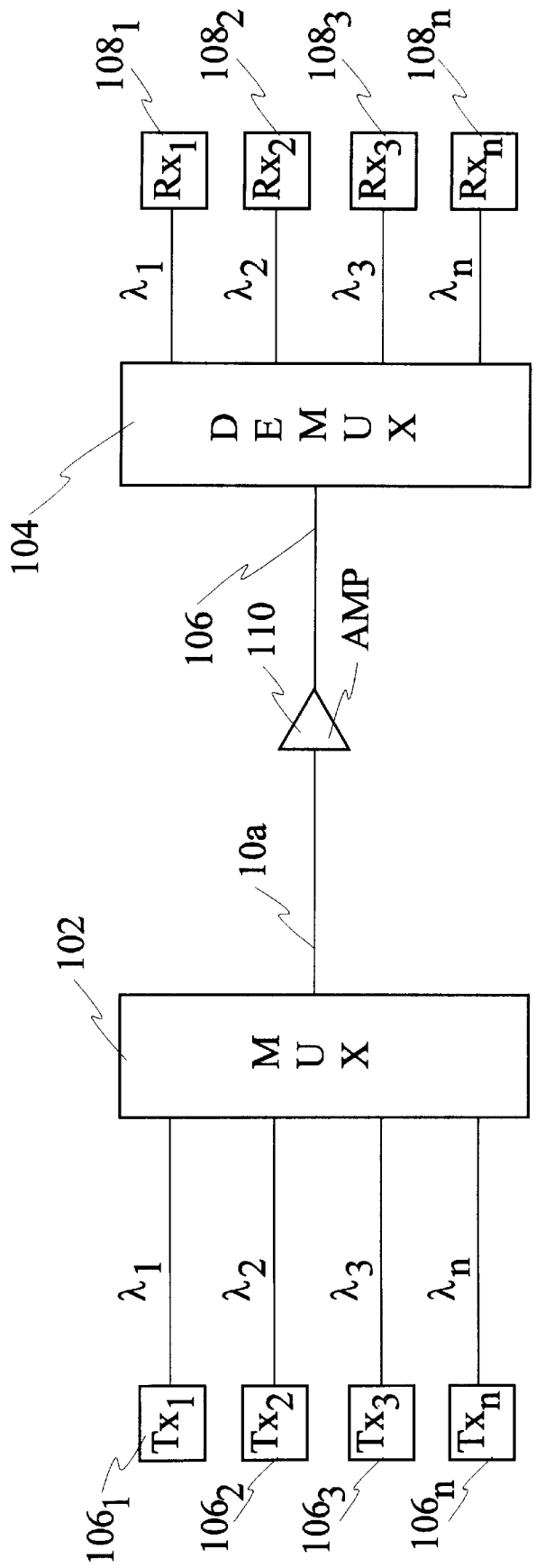
FIG. 1 is a block diagram of a prior art optical system having n transmitters transmitting at n wavelengths being multiplexed onto a single waveguide wherein amplification occurs prior to demultiplexing at a receiving end wherein n receivers are located.

Referring now to FIG. 1 a WDM transmission system is shown having n transmitters $Tx_1$ ($106_1$), $Tx_2$ ($106_2$), . . . $Tx_n$ ($106_n$) at a first end and n receivers $Rx_1$ ($108_1$), $Rx_2$ ($108_2$), . . . . $Rx_n$ ($108_2$) at an opposite end. A multiplexor 102 is optically coupled with the transmitters to receive optical signals having wavelengths $\lambda 1$, $\lambda 2$, . . . $\lambda n$ and to multiplex these signals onto a single optical waveguide in the form of an optical fibre 10a for transmission to the receivers ($108_1$ . . . $108_n$). A demultiplexor 104 is disposed about the receiving end of the transmission system for demultiplexing the single multi-wavelength optical signal transmitted on the optical fibre 10a and 10b. An erbium doped optical fibre amplifier (EDFA) 110 is disposed between the optical fibres 10a and 10b for amplifying the multi-wavelength signal destined for the receivers.

Erbium-Doped Fiber Amplifier (EDFA) Technology

In a typical dual-pumped optical amplifier there are either two or three optical isolators, two WDM filters, two laser pump sources, and a length of erbium-doped single mode fiber. If the amplifier is single-pumped, one of the pump source is provided and one WDM filter is provided.

WDM filters perform the function of coupling the pump source laser wavelength into the erbium-doped fiber. Pump energy is used to elevate the erbium ions concentrated in the erbium-doped fiber to a higher-than-normal energy level. These ions will stay excited until they decay on their own accord or are stimulated to decay by the arrival of a signal wavelength photon arriving from the transmission link 10a. It is through the process of "stimulated decay" that an optical signal is amplified in an EDFA. When an erbium doped optical amplifier is run in saturation, and no input signal is provided, the amplifier will output amplified stimulated emission (ASE) in the form of a noise signal.

Isolators function as one-way conduits for optical signals. In other words isolator elements allow an optical signal to pass in a single direction, e.g., from left to right, but not from right to left.

Consider the case where a signal photon enters the amplifier of FIG. 1 at its entry point. The photon passes through an isolator and enters the WDM filter (not shown), where it is routed into the length of erbium-doped fiber. Both during and preceding the arrival of the signal photon, laser pumps have been providing energy to the erbium-doped fiber via the WDMs, exciting the fiber's erbium ions. Upon entering the erbium fiber, the signal photon will cause decay of some of the excited erbium ions, releasing their energy in the form of (stimulated) photons. The original signal photon plus the stimulated photons then pass out of the WDM, through the output isolator, and back onto the transmission fiber 10b.

Several aspects of amplifier design and utilization are well-known to those of ordinary skill. Of great importance in network applications is the configuration of the optical amplifier. If optical isolators are used internal to the amplifier, then they make the amplifier an inherently unidirectional device. These isolators are important for eliminating the amplification of unwanted back reflections that could degrade system stability.

When a fault exists on a primary waveguide such as (10a or 10b), many optical systems provide redundant paths onto which optical signals are switched. However, before such switching can occur, the fault must be detected. If the break occurs along the optical fibre 10a, intensity detectors if provided at the receiver would likely not be able to discern normal signal traffic from ASE noise output from the saturated amplifier 110 and hence an alarm indicating a fault would not be triggered even though a fault is present.

Figure 2:
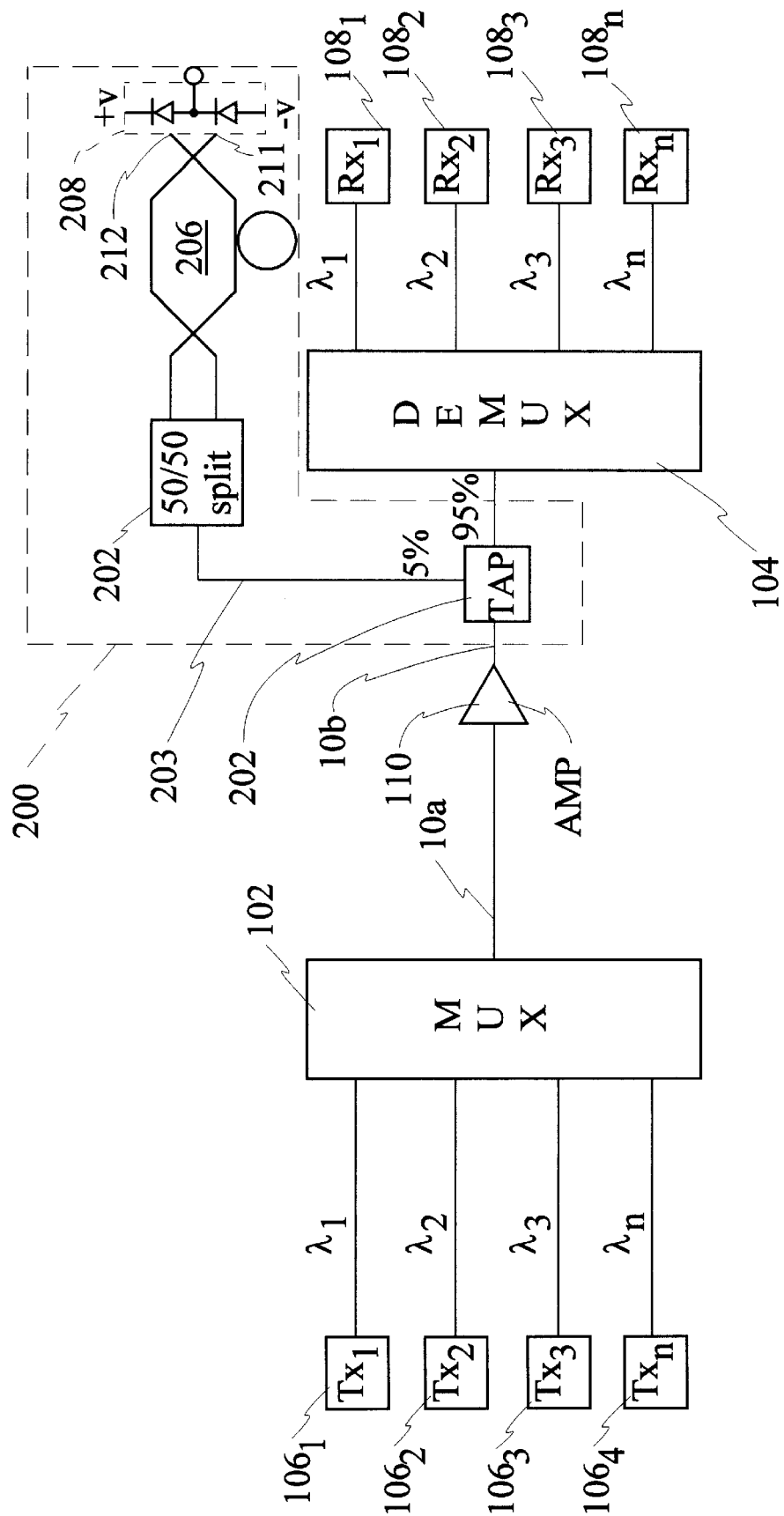
FIG. 2 is a schematic block diagram of a WDM system similar to that shown in FIG. 1 and having circuitry for fault detection, in accordance with this invention.

FIG. 2 includes an inexpensive means 200 in accordance with the invention, for detecting a break in the optical fibre 10a. The circuit 200 is capable of differentiating between spontaneous emission output by the saturated amplifier indicative of a fault, and regular signal traffic transmitted under normal operating conditions. A tap 202 is optically coupled to the fibre 10b for tapping a small portion (~5%) of the light present on 10b. A 50:50 splitter 204 receives the tapped light from an optical fibre 203 between the tap 202 and the splitter 204 and divides the received light evenly onto two paths. An unbalanced Mach Zehnder interferometer 206 is coupled to the output of the splitter for providing signals on two legs of the interferometer ending at two output ports 211, 212. The output response of the interferometer 206 is such that one leg has a response that corresponds to a 100 GHz ITU grid, wherein the other leg has a response having a same free spectral range, however shifted in wavelength by one half period. Hence, the response of one leg or branch of the interferometer coincides with the ITU channels having central wavelengths $\lambda 1 \ldots \lambda n$, wherein the other branch has a response that coincides with the interchannel wavelengths where little to no signal energy is expected except for low levels of crosstalk. A photodiode bridge 208 is optically coupled with the output ports 211 and 212 of the interferometer 206 such that a first photodiode of the pair comprising the bridge detects light from the output port 211 and a second photodiode detects light from the output port 212. A common terminal is provided to receive an electrical signal in the form of a voltage indicative of a fault in the fibre 10a, 10b, or a faulty amplifier 110. Unlike OTDR, which is costly to implement and whose performance affected by the presence of isolators within the circuit, the fault detection circuitry 200 is not adversely affected by the isolators within the amplifier, as the circuit 200 is in-line and downstream from the isolators.

The circuit 200 of FIG. 2 is designed to detect catastrophic failure due to a severing of the transmission waveguide. In operation, the circuit works in the following manner. When signal traffic is present and the n transmitters are transmitting data at their respective centre wavelengths $\lambda 1$ to $\lambda n$, the multiplexed signal is amplified by the EDFA optical amplifier 110. This amplified signal then propagates to its destination and is then routed to the demultiplexor 104 via the optical fibre 10b. Simultaneously, a small portion of the signal is routed to the Mach Zehnder interferometer 206 via the tap 202 and the splitter 204. The two signals output by the interferometer 206 are provided to the detectors at ports 211 and 212. Since the circuit in this mode is in normal operation and no faults exist, the corresponding leg and output port 211 having a response that coincides with the ITU channel grid will provide a signal to the adjacent photodiode that has power substantially equal to the power of the 5% tapped signal. The other leg however, having an output response that is shifted in phase by 180 degrees will have essentially no light energy at its output port 212; hence the photodiode bridge will not be balanced and a non-zero voltage will be present at the output terminal of the photodiode bridge, indicating normal unfaulty operation and an absence of a catastrophic break in transmission fibre 10a or 10b upstream from the tap.

When signal traffic is present and there is a break in the fibre 10a, the multiplexed signal destined for the receiving end will not reach the amplifier 110 and the amplifier will not have a data signal to amplify. However, since the amplifier is run in saturation mode, its ASE will be present at its output on optical fibre 10b and this noise signal will be transmitted to the n receivers $Rx_1$ (108$_1$), $RX_2$ (108$_2$), . . . $RX_n$ (108$_2$). ASE light tapped and provided to the Mach Zehnder interferometer will be substantially uniform in intensity throughout the spectrum from $\lambda 1$ to $\lambda n$, or at least substantially uniform at and between adjacent channels and light appearing at both output ports 211 and 212 will be substantially uniform in intensity; in this instance the bridge will be balanced. In the instance that the amplifier itself is faulty and is not transmitting, or where the optical fibre 10b is broken, the bridge will also be balanced having a zero voltage at its output terminal.

Figure 3:
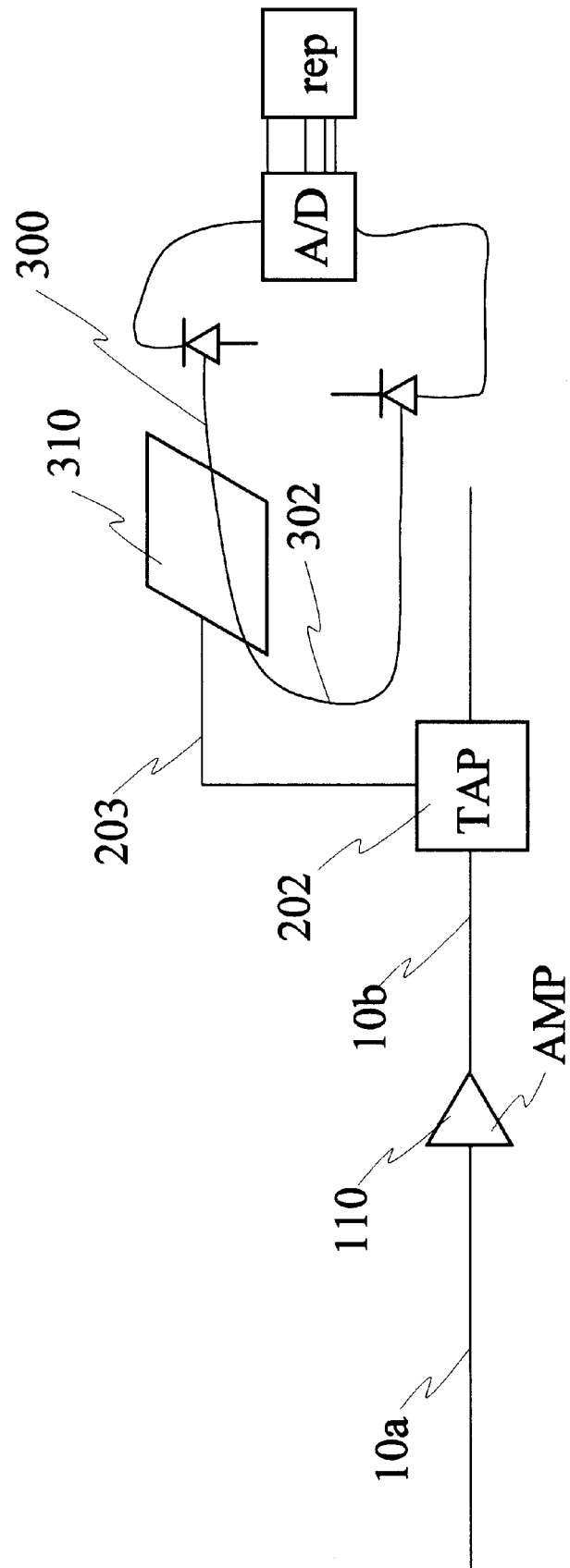
FIG. 3 is a schematic block diagram showing an alternative embodiment of fault detection circuitry utilizing a Fabry Perot etalon.

FIG. 3 shows an alternative embodiment of the invention, wherein the splitter 204 of FIG. 2 is not required and wherein the Mach Zehnder interferometer 206 is replaced with a Fabry Perot etalon 310, having a free spectral range in transmission that corresponds to the ITU channel spacing. The reflection output response along fibre 302 of the same etalon 310 is out of phase with the etalon's response in transmission and hence the transmission port and reflection port conveniently provide locations from which to place photodiodes in which to detect transmitted and reflected output light. In a condition where essentially all of the input light to the etalon 310 is detected at the transmission port, the system is running in a faultless manner. When substantially equal power is detected at the transmission and reflection ports, the circuit is deemed to have a fault. If equal power is detected above a predetermined threshold, the fault is determined to be in the optical fibre 10a. However if no power is detected at the output ports of the etalon, the fault is determined to be within the amplifier or within the fibre 10b.

Figure 4:
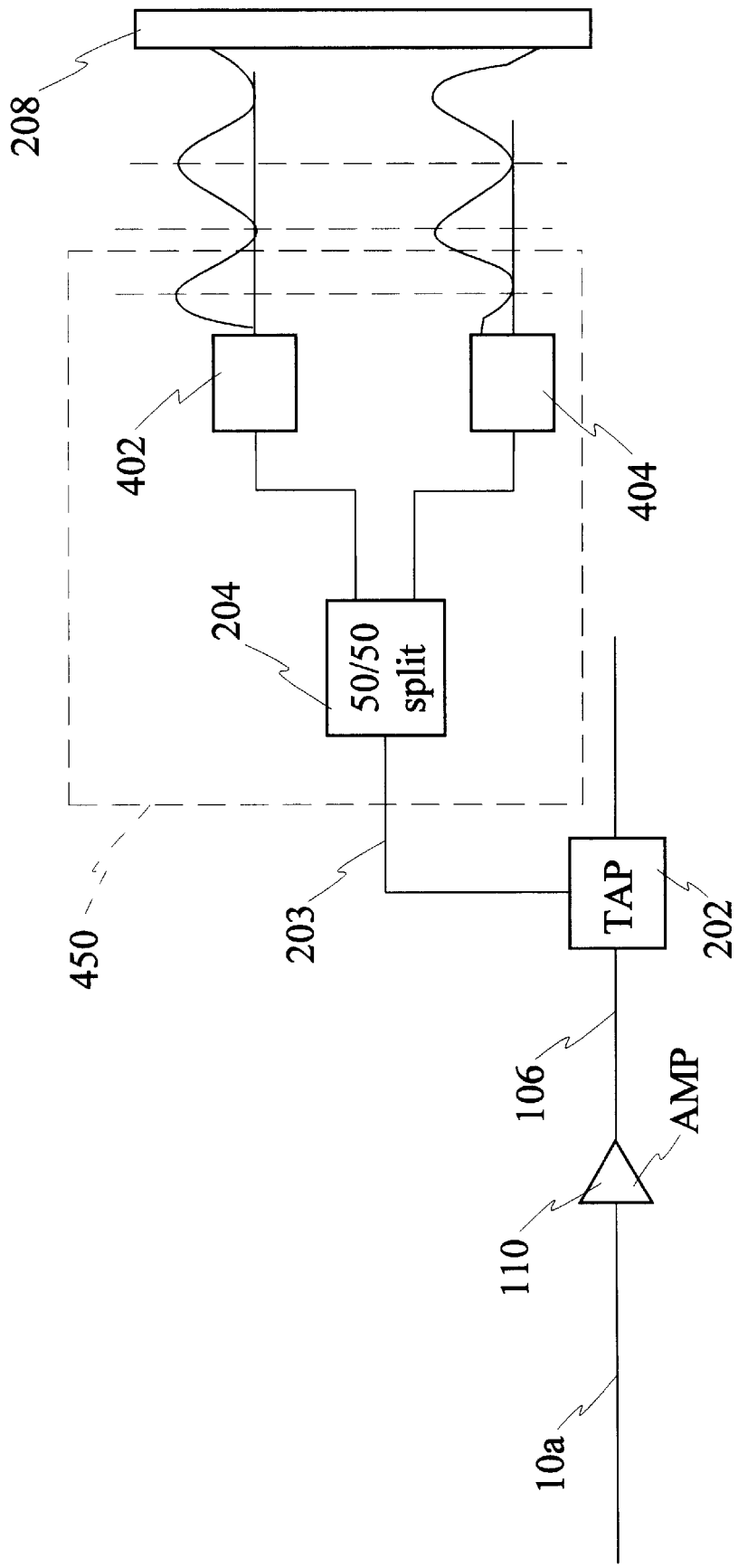
FIG. 4 is a schematic block diagram similar to that of FIG. 3 and having two Fabry Perot etalons; and, FIGS. 5a, 5b, and 5c depict the output response of the circuit shown in FIG. 4 including the splitter and pair of phase offset etalons.

FIG. 4 illustrates another embodiment wherein two periodic Fabry Perot etalons 402 and 404 are used. A splitter 204 provides equal portions of a signal tapped from fibre 10b to each of the etalons 402 and 404 which are out of phase and have a same free spectral range that corresponds in this example to an ITU channel spacing. However, more generally, the periodicity of the Mach Zehnder or Fabry Perot etalons in any of the embodiments described are selected to function with particular channel spacing.

Figure 5A:
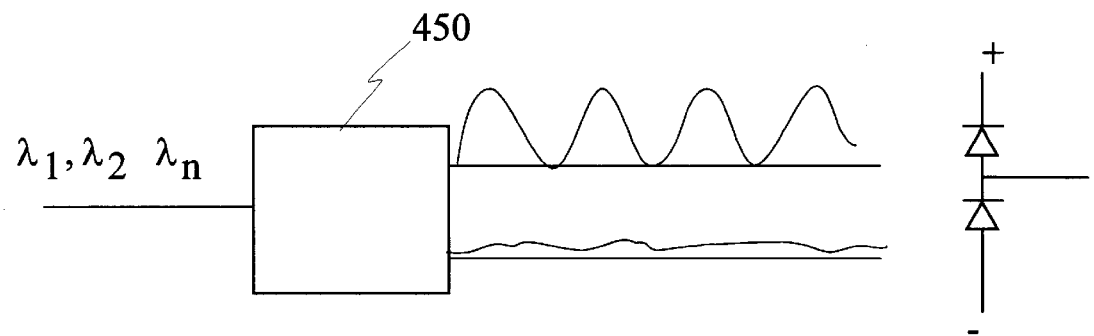
Figure 5B:
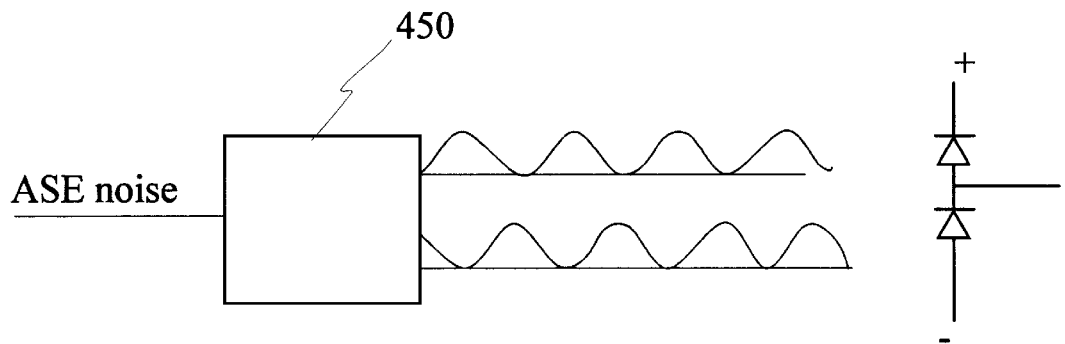
Figure 5C:
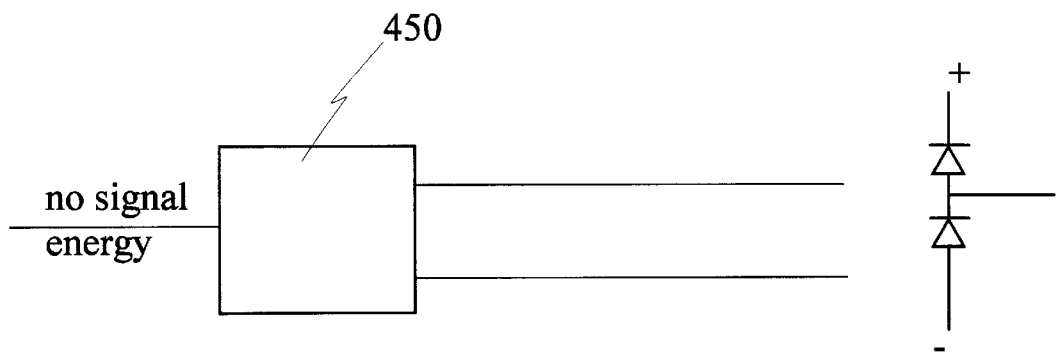

Turning now to FIGS. 5a, 5b, and 5c, a portion 450 of the circuitry in FIG. 4 shown in dotted outline including the splitter 204 and the etalons 402 and 404. FIG. 5a illustrates that when a typical multiplexed optical signal having channels corresponding to central wavelengths $\lambda 1 \ldots$ to $\lambda n$ are launched into the fault detection circuitry 450, one of the output legs outputs essentially a filtered response that includes the input channels. The other output leg outputs a 180 degree phase shifted version (i.e. shifted in wavelength by one half period) of the signal corresponding to the interchannel spacing; thus essentially no signal energy is present on this other leg.

In contrast, FIG. 5b illustrates that when ASE noise is input to the circuit 450 both of the output legs have a substantially same signal energy level output.

Furthermore, FIG. 5c illustrates that when no signal energy is input no signal energy is output on either of the legs.

In summary, when one of the output legs has a substantially different light energy level than the other leg, it can be assumed that no catastrophic faults occur upstream from the tap 202. Conversely, when both of the output legs have a substantially same light energy level, within some predetermined limits, it can be assumed that a catastrophic fault has occurred.

Although a photodiode bridge is shown in preferred embodiments of the invention as a means for detecting the intensity of light output from the various interferometric devices disclosed, a pair of detectors connected to suitably programmed processing means can be provided to allow for signal processing in order to establish the type of fault that may have occurred.

Of course numerous other embodiments may be envisaged without departing from the spirit and scope of the invention.

What is claimed is:

1. A fault detection circuit for optically coupling with an optical path in a multi-channel WDM optical system, said path having an amplifier disposed between an input waveguide and an output waveguide, said fault detection circuit comprising:

means for splitting at least some amplified light present on the output waveguide into a first and second sub signal at first and second output locations respectively, said means having an output response that is periodic in wavelength to an input optical signal and having a predetermined free spectral range at the first location that is offset in wavelength by one half period from a periodic output response to the input optical signal at the second location, and, means optically coupled with the output locations for providing an indication that a fault has occurred.

2. A fault detection circuit as defined in claim 1, wherein the offset in phase is a 180 degree offset.

3. A fault detection circuit as defined in claim 1 further comprising a tap for tapping some light from the output waveguide for testing for a fault.

4. A fault detection circuit as defined in claim 1 wherein the means for splitting at least some amplified light comprises a Mach-Zehnder interferometer having a spectral periodicity equal to the spacing of the WDM channels.

5. A fault detection circuit as defined in claim 1 wherein the means for splitting at least some amplified light comprises a first Fabry Perot etalon having a spectral periodicity equal to the spacing of the WDM channels.

6. A fault detection system as defined in claim 5, wherein the first location and the second location correspond to transmission and reflection responses respectively, of the etalon.

7. A fault detection system as defined in claim 5 wherein the means for splitting at least some amplified light includes a splitter and a second Fabry Perot etalon having a spectral response that is offset in phase from the first Fabry Perot etalon.

8. A fault detection system as defined in claim 1, further comprising detector means for detecting an intensity of light present at the first location and the second location.

9. A fault detection system as defined in claim 8, wherein the detector means comprises a photodiode bridge.

10. A fault detection circuit for optically coupling with an optical path in a multi-channel WDM optical system, said path having an amplifier disposed between an input waveguide and an output waveguide, said fault detection circuit comprising:

filter means having an input port and two output ports, said filter means having an output response that is periodic in wavelength at the output ports to light launched into the input port, the output response at one of the output ports being offset in wavelength by one half period with output response at the other of the output ports; and, detection means for detecting a characteristic of light at the output ports for determining if fault has occurred.

11. A fault detection circuit as defined in claim 10 including a tap for tapping some light from the output waveguide, and for providing tapped light to the input port of the filter.

12. A fault detection circuit as defined in claim 11, wherein the detection means includes a photodiode bridge.

13. A fault detection circuit as defined in claim 11, wherein the detection means includes a transducer for converting light detected at the output ports into electrical signals.

14. A fault detection circuit as defined in claim 13, including processing means for processing the electrical signals and deriving status information from the electrical signals.

15. A method of detecting a fault in an optical path in a multi-channel WDM optical system, said path having an amplifier disposed between an input waveguide and an output waveguide, said method comprising:

tapping a portion of amplified light present on the output waveguide;

providing said tapped light to a filter;

detecting at two locations any light from the filter that is present said light at said two locations being phase misaligned in wavelength;

determining from the detected light or absence of light at the locations if a fault is present.

16. A method as defined in claim 15, wherein the filter has a periodic output response.

17. A method as defined in claim 16 wherein the periodic output response of the filter corresponds to channels of the multi-channel WDM system.

* * * * *